United States Patent
Weidinger et al.

[19]

[11] Patent Number: 6,029,788
[45] Date of Patent: Feb. 29, 2000

[54] FRICTION CLUTCH WITH WEAR COMPENSATION

[75] Inventors: Reinhold Weidinger, Unterspiesheim; Michael Weiss, Dittelbrunn, both of Germany

[73] Assignee: Mannesmann Sachs AG, Scweinfurt, Germany

[21] Appl. No.: 09/121,242

[22] Filed: Jul. 23, 1998

[30] Foreign Application Priority Data

Jul. 23, 1997 [DE] Germany ............................ 197 31 611

[51] Int. Cl.[7] ..................................... F16D 13/75
[52] U.S. Cl. ..................... 192/70.25; 192/111 A
[58] Field of Search .............................. 192/70.25, 111 A

[56] References Cited

U.S. PATENT DOCUMENTS

| | | | |
|---|---|---|---|
| 5,377,803 | 1/1995 | Link et al. ........................ | 192/70.25 X |
| 5,509,518 | 4/1996 | Zelikov . | |
| 5,540,313 | 7/1996 | Weidinger ........................... | 192/70.25 |
| 5,560,463 | 10/1996 | Link et al. ........................... | 192/70.25 |
| 5,690,203 | 11/1997 | Link et al. ........................... | 192/70.25 |
| 5,727,666 | 3/1998 | Maucher .............................. | 192/70.25 |

FOREIGN PATENT DOCUMENTS

| | | |
|---|---|---|
| 44 12 107 | 11/1994 | Germany . |
| 195 06 698 | 9/1996 | Germany . |
| 43 06 688 | 11/1998 | Germany . |

*Primary Examiner*—Rodney H. Bonck
*Attorney, Agent, or Firm*—Cohen, Pontani, Lieberman & Pavane

[57] ABSTRACT

A friction clutch having a housing which is connectable with a flywheel of an internal combustion engine so as to be fixed with respect to rotation relative to the flywheel. A pressure plate is arranged in the housing and is acted upon by a spring for pressing a clutch disk provided with friction facings against the flywheel. A compensation device, that includes at least one element which is changeable along its axial dimension, serves to compensate for the change in position of the pressure plate brought about by wear of the friction facings. A feeler is arranged so that it cannot change position relative to the pressure plate. The contact pressing force of the spring acts on the pressure plate via the compensation device. The feeler is arranged in the housing and a spring, which is fastened to the pressure plate and exerts an axial force on the compensation device, contacts the feeler at its free end.

8 Claims, 3 Drawing Sheets

FRICTION CLUTCH WITH WEAR COMPENSATION

BACKGROUND OF THE INVENTION

1. Field of the Invention

The present invention relates to a friction clutch, especially for motor vehicles, and more particularly to a friction clutch having a housing that is connectable with a flywheel of an internal combustion engine so as to be fixed with respect to rotation relative to the flywheel, a pressure plate which is arranged in the housing and is acted upon by a spring for pressing a clutch disk provided with friction facings against the flywheel, and a device that comprises at least one element which is changeable along its axial dimensions. The device serves to compensate for the change in position of the pressure plate brought about by wear of the friction facings. A feeler is arranged so that it cannot change position, wherein the contact pressing force of the spring acts on the pressure plate via the compensation device.

2. Discussion of the Prior Art

A friction clutch of the type mentioned above is known, for example, from German reference DE 43 06 688 C2. This clutch is provided with a feeler which is guided out of the clutch housing and is formed of a pin contacting the flywheel and a lever fastened to the pin. The lever is guided back into the interior of the clutch through a recess provided in the housing and contacts the diaphragm spring. The adjustment device is formed by a slotted conical ring which is pretensioned between the pressure plate and the diaphragm spring. The pin of the feeler projecting through the pressure plate is loaded by a conical spring so that it is seated on a tilt and clamped.

German reference DE 195 06 698 A1 also discloses a friction clutch with automatic wear compensation. The play transmitter is likewise formed by a pin which contacts the flywheel and is guided through the pressure plate. A lever which projects inward radially is fastened to the pin and contacts, by its free end, a compensation device formed of two adjustment rings.

It is disadvantageous that the tilting must be configured for the least favorable operating state, so that it is safely ensured, for example, at high rates of rotation or high axial accelerations. A failure of the tilting leads to an unwanted displacement of the compensation device or to failure of the clutch.

SUMMARY OF THE INVENTION

Based on this problem, the invention has the object of improving the friction clutch of the type mentioned above.

Pursuant to this object, and others which will become apparent hereafter, one aspect of the present invention resides in arranging the feeler in the housing. A spring is fastened to the pressure plate, exerts an axial force on the compensation device, and contacts the feeler by its free end.

Due to this construction, the feeler and the compensation device are separate from one another and the functions of wear detection and limiting of the compensation device are independent from one another. Extreme operating conditions due to failure of the tilting do not lead to a misadjustment or displacement of the compensation device and accordingly do not result in failure of the clutch. The tilt is designed only for normal operating conditions.

The compensation device preferably comprises at least one adjustment ring which is provided with an inclination at its lateral surface and is rotatable relative to the pressure plate. It is particularly advantageous when a compensation device, known per se, comprises two adjustment rings which contact one another and are rotatable relative to one another and are each provided with at least one inclination on the lateral surfaces facing one another and are pretensioned relative to one another in the rotating direction. A compensation device of this kind is disclosed, for example, in German reference DE 44 12 107 A1.

The spring which is fastened to the pressure plate holds the adjustment rings in position, these adjustment rings being tensioned relative to one another, when the clutch is released and the spring exerting the contact pressing force relieves the adjustment rings. When wear occurs at the friction facings and the pressure plate consequently wanders in the direction of the flywheel, the feeler which is contacted by the free end of the spring lifts the spring from the adjustment rings. At the same time, the feeler tilts in the pressure plate so that the rings can rotate relative to one another during the subsequent release movement because of their pretensioning and compensate for the play brought about by wear.

The spring is preferably a leaf spring and can make contact in the area of its free end in a recess in the adjustment ring remote of the pressing plate.

A particularly simple construction of the feeler is achieved by a pin and a lever which is fastened thereto and projects radially inward. The radial inner end of the lever is preferably angled axially in the direction of the housing, so that a good contact location is provided for the spring fastened to the pressure plate. The feeler can contact the flywheel or the housing. The feeler can be guided in a bore hole in the pressure plate or on a pin that is fixedly connected with the pressure plate.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
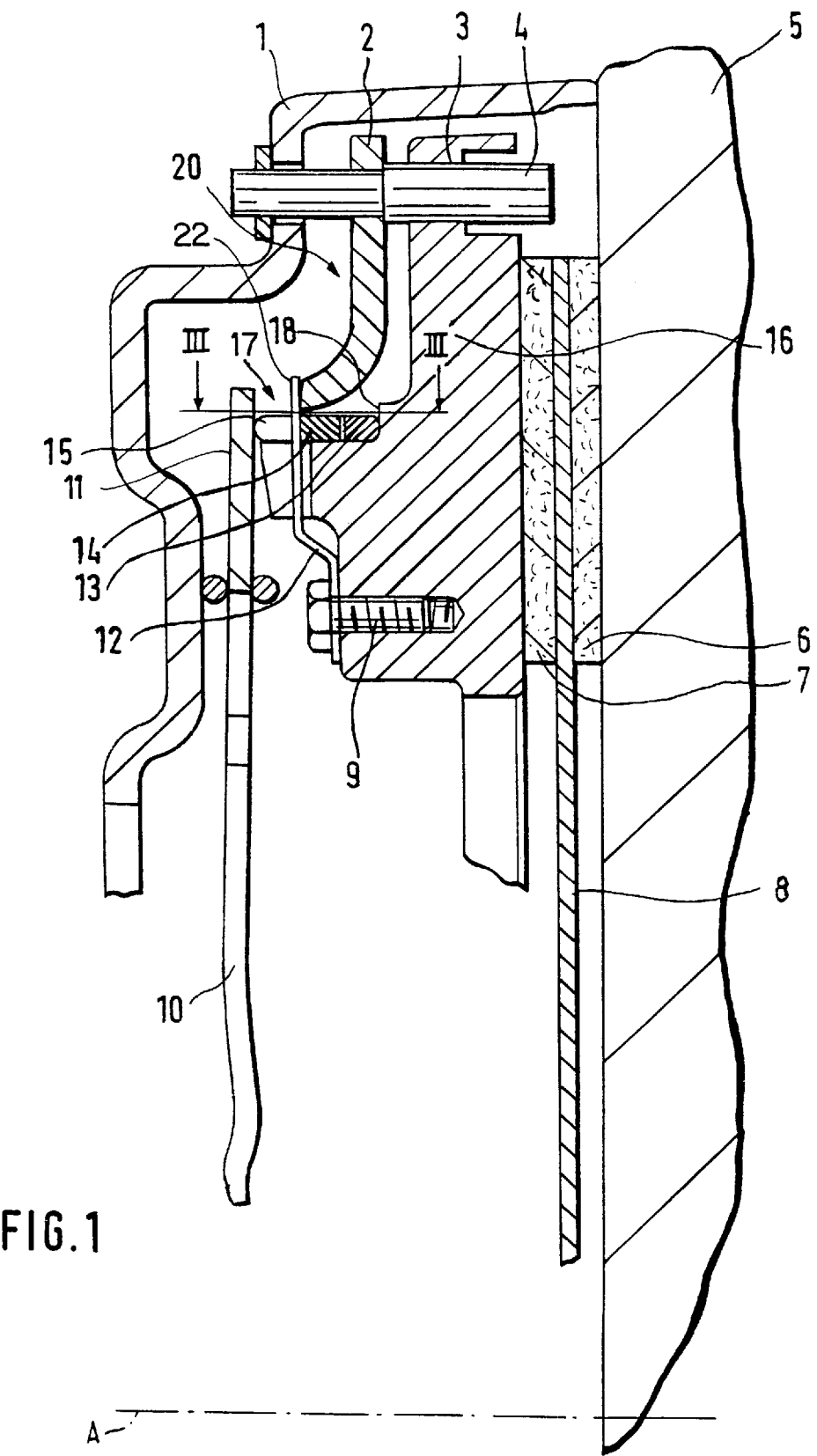
FIG. 1 is a simplified view showing the partial longitudinal section of a clutch of a first embodiment of the invention.
Figure 2:
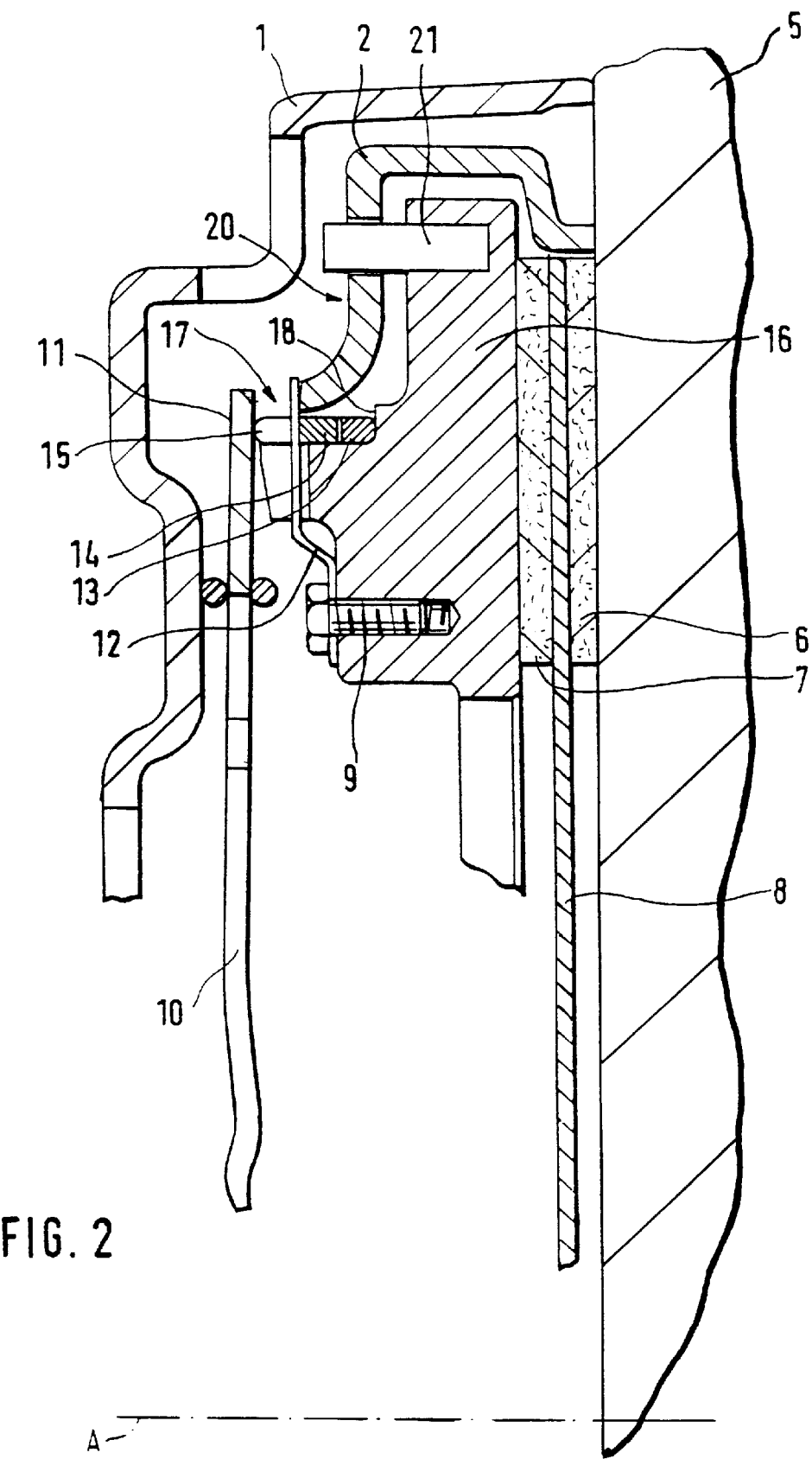
FIG. 2 is a simplified view showing the partial longitudinal section of a clutch of a second embodiment.
Figure 3:
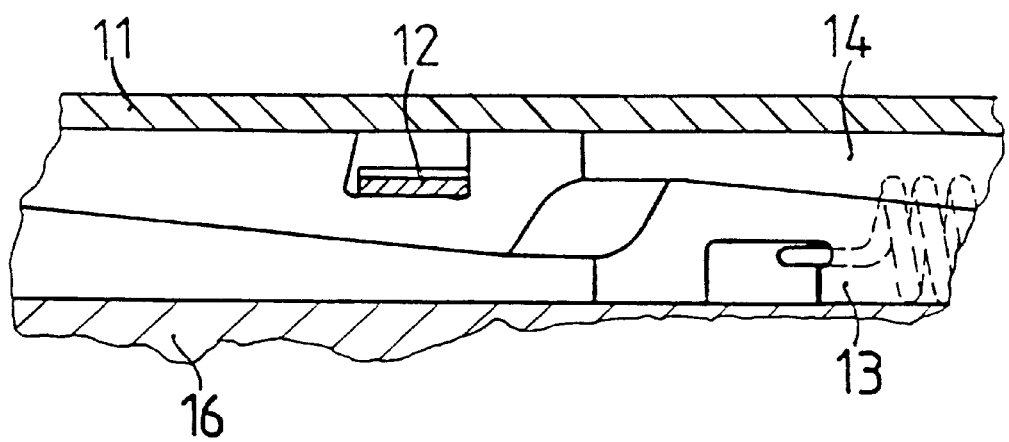
FIG. 3 is a section along line III—III in FIG. 1.

The friction clutch comprises a housing 1 which is connected with a flywheel 5 of an internal combustion engine, not shown in more detail, such that is it fixed with respect to rotation relative to the flywheel 5 and rotates about the axis of rotation A. A pressure plate 16 which is acted upon by a diaphragm spring 10 is arranged in the housing 1 and presses a clutch disk 8 provided with friction facings 6, 7 against the flywheel 5. Adjustment rings 13, 14 are arranged in an axial recess 18 in the pressure plate 16 and are pretensioned relative to one another and rotatable relative to one another in the circumferential direction by means of at least one spring, not shown. The contact pressing force applied by the diaphragm spring 10 acts with its free end 11 on the pressure plate 16 via the adjustment rings. A spring 12 is fastened by a screw 9 to the pressure plate 16 and extends radially outward at its free end 22. In the area of its free end 22, the spring 12 fits in a recess 15 provided in the adjustment ring 14 and exerts axial force on a compensation device 17 formed by the adjustment rings 13, 14. A feeler 20 comprises the pin 4 which is guided through a bore hole 3 in the pressure plate 16 and contacts the flywheel 5 and a lever 2 fastened to the pin 4. The lever 2 is guided radially inward and is angled axially at its free end in the direction of the clutch housing 1. The free end of the lever 2 contacts the free end 22 of the spring 12. As a result of the force which the spring 12 also exerts on the lever 2, a torque acts on the feeler 20 which tilts the pin 4 in the bore hole 3.

If wear occurs at the friction facings 6, 7, the pressure plate 16 wanders in the direction of tie flywheel 5. This same movement is also carried out by the adjustment rings 13, 14. The feeler 20, which is not changeable with respect to its position, lifts the spring 12 from the adjustment ring 14, so that it can no longer exert any force on the adjustment rings 13, 14. During the next clutch release movement, the adjustment rings 13, 14 and the pressure plate 16 are relieved by the diaphragm spring 10 and the adjustment rings 13, 14 can be rotated relative to one another until the ring 14 comes into contact again with the spring 12 and the spring 12 exerts an axial force opposing further rotation of the adjustment rings 13, 14. The feeler 20 could also engage at the housing 1. Instead of tilting in a bore hole 3 in the pressure plate 16, the feeler 20 can also tilt on a pin 21 fastened in the pressure plate 16 and can be guided past the pressure plate 16 radially outside and contact the flywheel 5 by its end. It is essential for operation only that the feeler 20 is displaceable in the axial direction relative to the pressure place 16.

The invention is not limited by the embodiments described above which are presented as examples only but can be modified in various ways within the scope of protection defined by the appended patent claims.

We claim:

1. A friction clutch, comprising:

a housing which is connectable with a flywheel of an internal combustion engine so as to be fixed with respect to rotation relative to the flywheel;

a pressure plate arranged in the housing;

a clutch disk having friction facings and arranged in the housing;

first spring means for pressing the clutch disk against the flywheel;

means for compensating for a change in position of the pressure plate brought about by wear of the friction facings, the compensating means including at least one element which is changeable along an axial dimension of the one element;

a feeler arranged in the housing so that the feeler cannot change position, the spring means being arranged to exert a contact pressing force on the pressure plate via the compensation means; and second spring means fastened to the pressure plate for exerting an axial force on the compensation means and arranged to contact a radially inner free end of the feeler, whereby wear detection and position compensation are carried out separately.

2. A friction clutch according to claim 1, wherein the compensating means further includes at least one adjustment ring provided with an inclination at its lateral surface and rotatable relative to the pressure plate.

3. A friction clutch according to claim 2, wherein the compensating means includes two adjustment rings arranged so as to contact one another and be rotatable relative to one another, each of the rings having at least one inclination on the lateral surfaces facing one another and being pretensioned relative to one another in a rotating direction.

4. A friction clutch according to claim 2, wherein the second spring means includes a leaf spring.

5. A friction clutch according to claim 4, wherein the adjustment ring has a recess, and the spring has a free end, the spring being arranged to rest in the recess in the adjustment ring at a region of the free end.

6. A friction clutch according to claim 1, wherein the feeler includes a pin and a lever fastened to the pin so as to project radially inward.

7. A friction clutch according to claim 6, wherein the lever has a radial inner end that is angled axially toward the housing.

8. A friction clutch according to claim 1, and further comprising a pin connected with the feeler, the feeler being guided on the pin.

* * * * *